(12) United States Patent
Guillemin et al.

(10) Patent No.: US 6,285,835 B1
(45) Date of Patent: Sep. 4, 2001

(54) UTILIZING PRINTER MEMORY FOR AUTOMATIC USER MESSAGING

(75) Inventors: Gustavo M. Guillemin; Alejandro Wiechers, both of Jalisco (MX)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/481,727

(22) Filed: Jan. 11, 2000

(51) Int. Cl.[7] .................................................. G03G 15/00
(52) U.S. Cl. ................................ 399/8; 399/12; 399/24; 399/27; 399/81
(58) Field of Search ................................ 399/8, 11, 10, 399/24, 81, 27, 15, 12

(56) References Cited

U.S. PATENT DOCUMENTS

| | | | |
|---|---|---|---|
| 5,491,540 | | 2/1996 | Hirst . |
| 5,619,307 | * | 4/1997 | Machno et al. ........................ 399/11 |
| 5,682,140 | * | 10/1997 | Christensen et al. . |
| 5,699,091 | | 12/1997 | Bullock et al. ........................ 347/19 |
| 5,717,974 | * | 2/1998 | Park ........................................ 399/24 |
| 5,761,566 | * | 6/1998 | Suzuki et al. . |
| 5,802,420 | * | 9/1998 | Garr et al. .......................... 399/24 X |
| 5,930,553 | * | 7/1999 | Hirst et al. ................................ 399/8 |
| 6,108,492 | * | 8/2000 | Miyachi ................................ 399/8 X |
| 6,113,208 | * | 9/2000 | Benjamin et al. . |

FOREIGN PATENT DOCUMENTS

| | | | |
|---|---|---|---|
| 3-26583 | * | 2/1991 | (JP) . |
| 4-29270 | * | 1/1992 | (JP) . |
| 9-240018 | * | 9/1997 | (JP) . |

OTHER PUBLICATIONS

Lalande, John; "Cut Printers' Consuming Costs"; *Smart Computing in Plain English*; vol. 10, Issue 6; Jun. 1999.*

* cited by examiner

*Primary Examiner*—Susan S. Y. Lee

(57) ABSTRACT

A printing system provides consumer messages to users of the printing device by storing user message data in memory located in the printing device and displaying the user message upon the occurrence of a certain event. The user message data may either be an electronic representation of the user message, or it may be a pointer corresponding to an external memory location that contains the electronic representation of the user message.

10 Claims, 5 Drawing Sheets

UTILIZING PRINTER MEMORY FOR AUTOMATIC USER MESSAGING

TECHNICAL FIELD

This invention generally relates to printing devices with memory and, more particularly, to printing devices utilizing memory to display marketing information to the user.

BACKGROUND

In a free market economy, where consumer markets are driven by competition between providers of goods, a provider wishing to compete for consumer business must make potential customers aware of the advantages and benefits of the provider's product. Such a provider must rely on effective marketing campaigns to educate potential customers about the product.

Designing an effective marketing campaign is necessarily limited by the means of the provider to fund advertising. Since virtually all providers have limited funds available for advertising, it is important to employ an advertising strategy that is efficient as well as effective.

Identifying consumers of similar products who might use the provider's product (the relevant market) and delivering a message about the product to as many such consumers as possible is the goal of an advertising campaign. Indirect marketing techniques—such as television commercials and magazine advertisements—are methods through which a provider delivers one advertising message that may reach many potential customers. While indirect marketing is common, the most efficient delivery of an advertising message is through direct marketing. With direct marketing, the provider delivers one advertising message for each identified potential customer that the provider plans to reach. This makes the most efficient use of the provider's funds spent on advertising For example, when a provider pays for a television commercial to advertise his product, he cannot definitively know how many likely consumers of his product he will reach with the advertisement. While the provider may rely on statistics to determine how many people receive the message, it is impossible for the provider to know how many people receiving the message are within the relevant market and how many are not. Direct marketing has the advantage that the provider can be assured that all the money being spent on advertising is going to delivering the message to the consumers who are likely to be in the relevant market.

Manufacturers of printing devices such as printers, fax machines, copiers, etc., and replacement parts for such devices face the same marketing problems as any other provider in a competitive market. However, such manufacturers have a slight advantage in that, when a sale of such a device is made, replaceable component will inevitably be required for the device, such as toner cartridges, drums, etc. In addition, the devices may require service at some time or another. These events may be utilized to trigger marketing messages directed to the owner of the printing device.

SUMMARY

Many printing devices are equipped with an electronic memory. This memory can be utilized by a manufacturer of such a printing device to provide a consumer message to a user of the printing device. Thus, the manufacturer of the printing device is afforded an excellent opportunity to reach every customer directly, thereby greatly increasing the likelihood of retaining the customer's future business. The consumer message may be related to accessories and replacement parts for the printing device, to services available for the printing device, or to other printing devices marketed by the manufacturer.

The present invention contemplates a printing system that provides consumer messaging to printing device users by storing user message data in memory located in the printing device. User messages are displayed to the user based on the occurrence of a predetermined and/or user-determined trigger event. The user message is designed to be displayed to the user when a trigger event occurs. For example, a user message may be printed on a test page whenever the printing device prints a test page for examination by the user. In a laser printer, the user message may be displayed when a replaceable component such as a toner cartridge is initially installed into the printing device and a test page is printed to ensure the functionality of the parts that were replaced. The test page may be designed to include a marketing message directed to the printing device user.

The user message data from which a user message is derived may comprise the complete electronic representation of the message. Alternatively, the user message data may comprise a pointer that identifies one of various messages that are stored in memory external to the cartridge, such as in a host computer connected to the printing device.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
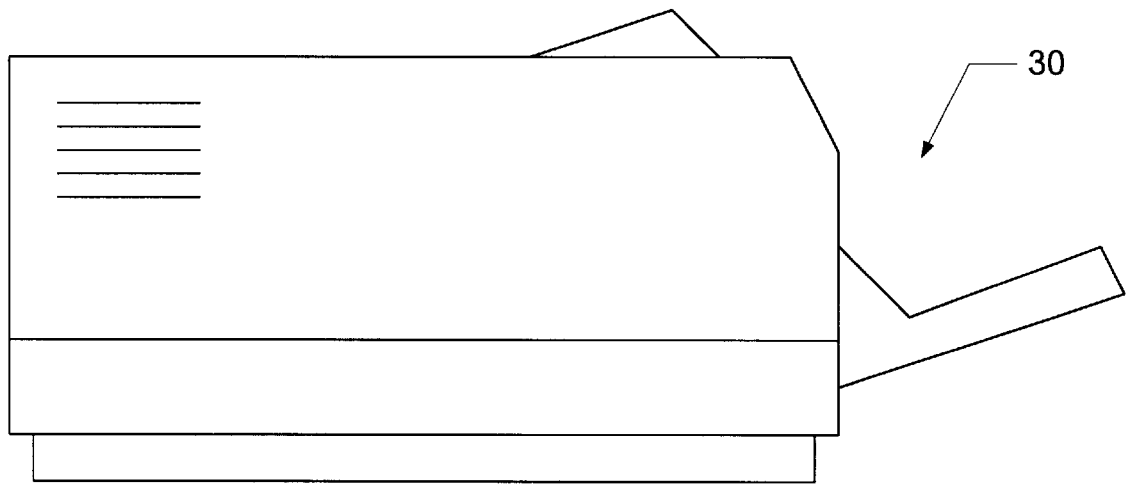
FIG. 1 is a diagrammatic illustration of a laser printer.

FIG. 1 is a diagrammatic illustration of a laser printer 30 in which the present invention may be implemented. The invention may further be implemented in other units that employ printing devices, such as photocopiers, facsimile machines, and the like. For purposes of discussion, the invention is described in the context of laser printers.

Figure 2:
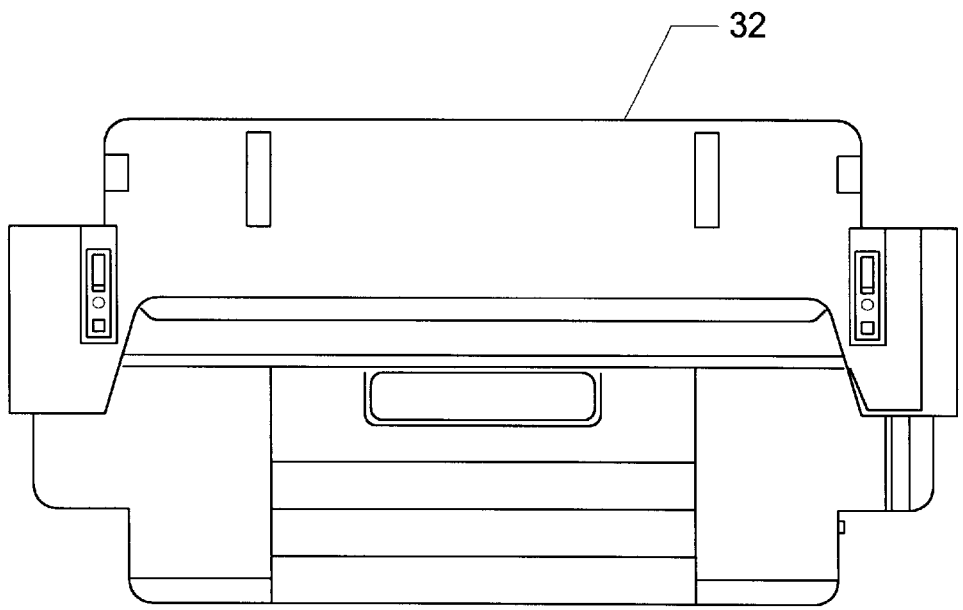
FIG. 2 is a diagrammatic illustration of a laser printer toner cartridge.

FIG. 2 shows a toner cartridge 32 that is installable in the laser printer 30. Although the invention is shown and described herein utilizes a printer toner cartridge for a laser printer, it is noted that the invention may be utilized with any replaceable component (toner cartridge, ink cartridge, imager drum, fuser, etc.) installable in a printing device (printer, copier, fax machine, etc.).

Figure 3:
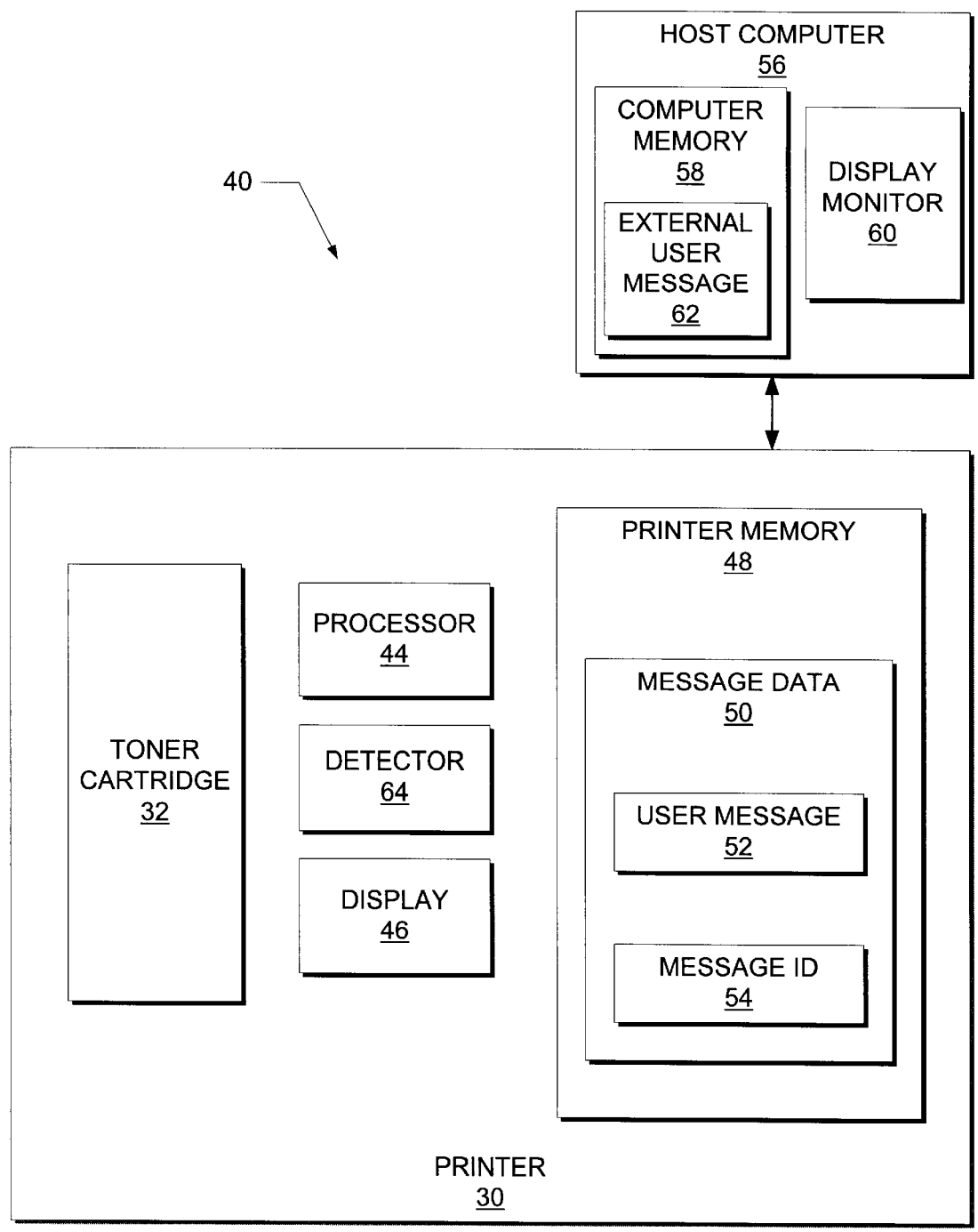
FIG. 3 is a block diagram of a printing system.

FIG. 3 is a block diagram of printing system 40 that includes the printer 30 which has the toner cartridge 32 installed therein. The toner cartridge 32 may be removed and replaced by another toner cartridge (not shown). The printer also has a processor 44 and a display 46 for displaying characters to a printer user.

The printer also comprises printer memory 48 that contains message data 50. As shown, the message data 50 stores a user message 52 to be displayed to the printer user, and a message identifier 54. As will become clear as this discussion progresses, the invention may be implemented using either the user message 52 or the message identifier 54.

The user message 52 is an electronic representation of the user message that is displayed to the user. If there is sufficient printer memory 48 available after making allocation for the amount of printer memory 48 required by the printer 30 for normal printing operations or for test page printing considerations, the user message 52 is stored directly in the printer memory 48. If there is not enough unallocated printer memory 48 to store the user message 52 in its entirety, the message identifier 54 is utilized.

The message identifier 52 is a pointer that points to a memory location external to the printer where an actual user message is stored. FIG. 3 depicts a typical system in which the printer 30 is connected to a host computer 56. The host computer 56 includes computer memory 58 and a display monitor 60. An external user message 62 is stored in the computer memory 58. As will be discussed in greater detail below, the message identifier 54 corresponds to the external user message 62.

The printer 30 also comprises a detector 64 that is configured to detect the occurrence of the trigger event that occurs within the printer 30. The detector 64 is also configured to correlate the message identifier 54 with the trigger event. The trigger event may be predefined by the manufacturer, such as when the toner cartridge 32 is initially installed into the printer 30 or any time a test page is printed from the printer 30. A trigger event may also be a user or vendor defined event, such as the printing of a certain number of pages from the toner cartridge 32.

It is noted that although the functional components of the printing system 40 are shown in specific locations, the functional components may be located on the printer 30, the toner cartridge 32 or the host computer 56, provided the functionality of the printing system 40 is preserved.

Figure 4:
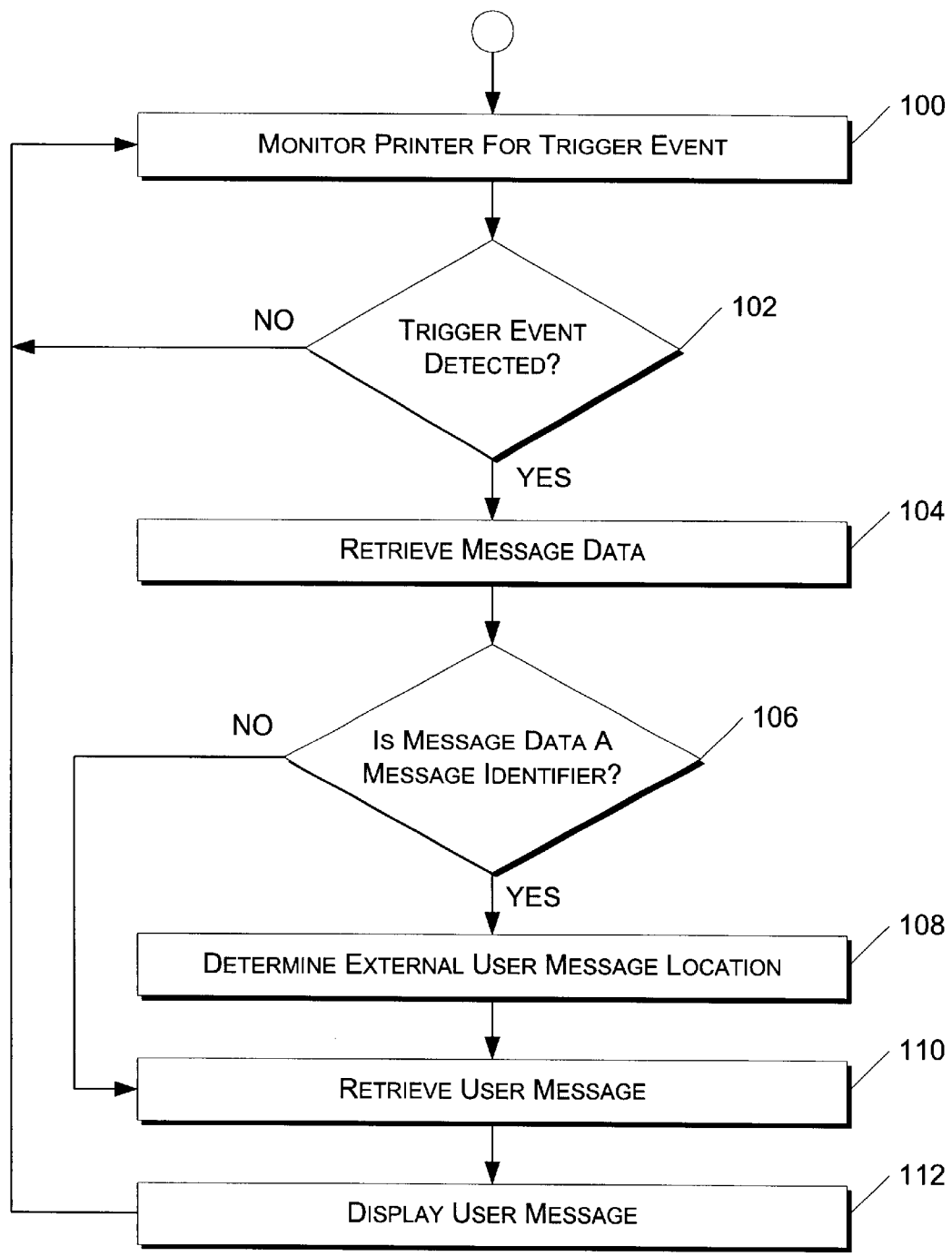
FIG. 4 is a flow diagram of a messaging process utilizing printer memory.

FIG. 4 depicts a flow diagram of a messaging process utilizing the printer memory 48. At step 100, the detector 64 monitors the printer 30 for an occurrence of the trigger event. For discussion purposes, the trigger event is when the toner cartridge 32 is initially installed into the printer 30.

Step 100 shows that the printer 30 is continuously monitored by the detector 64 for an occurrence of the trigger event, the installation of the toner cartridge 32. As shown at step 102, when the toner cartridge 32 installation is detected, the detector 64 is configured to retrieve the message data 50 from the printer memory 48 (step 104). If the retrieved message data 50 is the message identifier 54 ("YES" branch, step 106), then the location corresponding to the message identifier 54 is determined (step 108). This can be accomplished in different ways, which will be explained in detail below with reference to FIG. 5 and FIG. 6.

If, however, the retrieved message data 50 is the user message 52 ("NO" branch, step 106), then the location of the user message 52 does not have to be determined, since the user message 52 is stored directly in the printer memory 48. If the message data 50 is the user message 52, then the user message 52 is retrieved (step 110) and displayed to the user (step 112). If the message data 50 is the message identifier 54, then the external user message 62 is determined at step 108, retrieved from the computer memory 58 (step 110) and displayed to the user at step 112. The retrieved message (user message 52 or external user message 62) is either displayed to the user on the display 46 of the printer 30, or it is transmitted to the host computer 56 for display on the display monitor 60.

Figure 5:
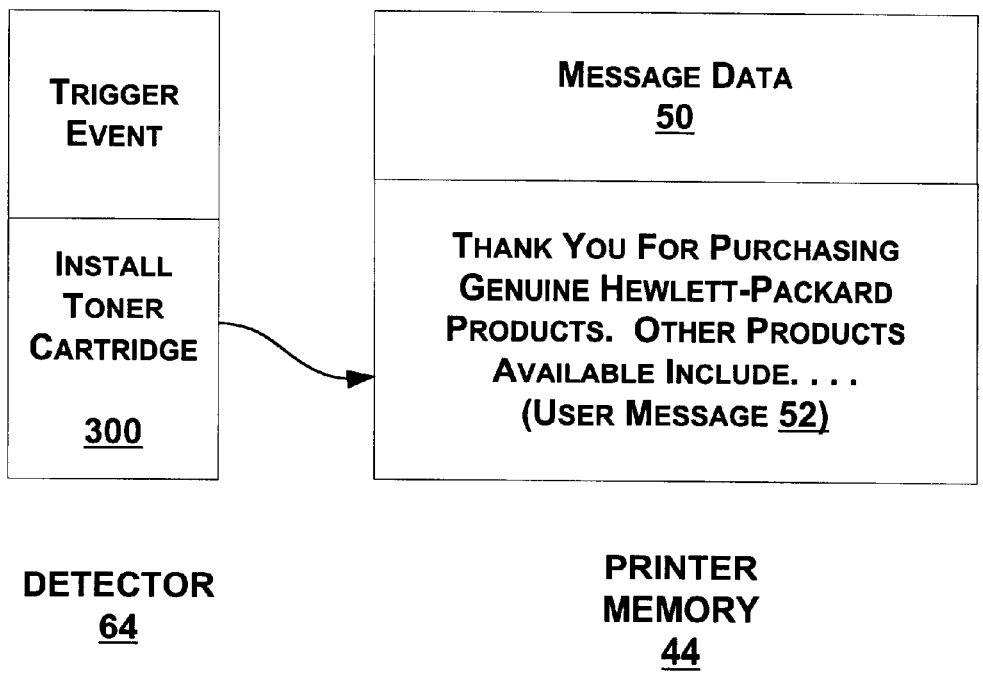
FIG. 5 is a diagram of a messaging process that stores user messages in printer memory.

As stated previously, there are different ways that the detector 64 may retrieve the user message 52. FIG. 5 shows that one way to accomplish this is to store the user message 52 directly as the message data 50 in the printer memory 48. This can be accomplished if the printer memory 48 is of sufficient size to contain the complete electronic representations of the user message 52.

The detector 64 is configured to detect a trigger event which, in the present example, is when the toner cartridge 32 is installed 3020. When the detector 64 detects the installation, the detector 64 is configured to read the message data 50 from the printer memory 48. The message data 50 in this instance is the user message 52 ("Thank You For Purchasing Genuine Hewlett-Packard Products. Other Products Available Include . . ."). This message is then displayed to the user by either of the methods described above.

Since it may be the case that the printer memory 48 will not have the capacity to store the user message 52 in its complete form while still allocating sufficient printer memory 48 to handle normal printer operations, another way that the detector 64 can retrieve a user message to display to the user is to store the external user message 62 in memory outside the printer 30, as illustrated in FIG. 3. In the present example, the external user message 62 is stored in the computer memory 58 of the host computer 56. When the external user message 62 is utilized, the message data 50 comprises the message identifier 54, which is a pointer that corresponds to the external user message 62. The detector 64 utilizes the message identifier 54 associated with the trigger event to determine the location of the external user message 62 that is to be displayed in response to the trigger event.

Figure 6:
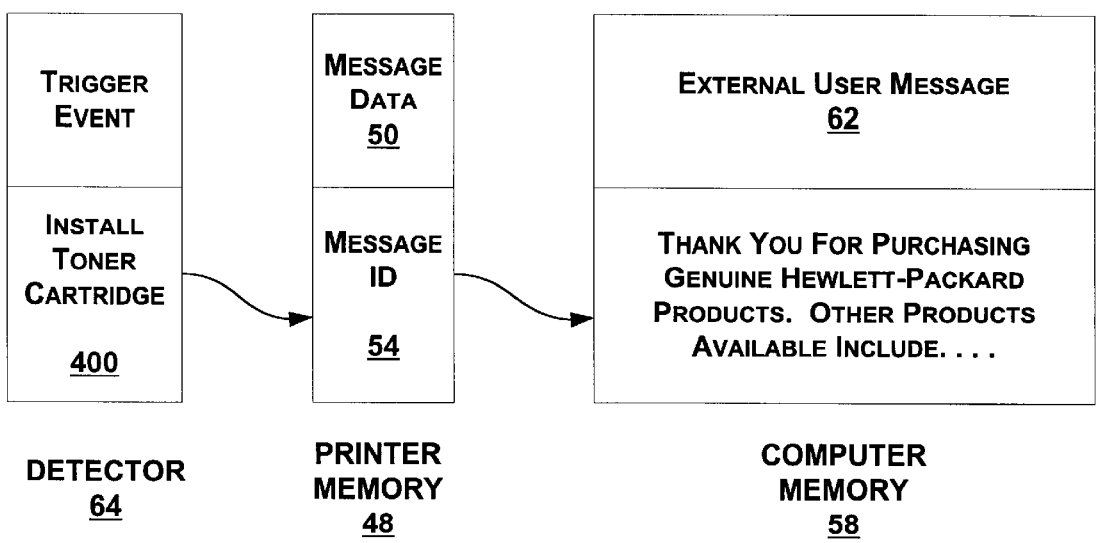
FIG. 6 is a diagram of a messaging process that stores user messages in memory external to the printer.

FIG. 6 depicts the configuration used in this example. The detector 64 is configured to detect the occurrence of the trigger event—installation of the toner cartridge 32 into the printer 30. When the toner cartridge 32 is installed 400, the detector 64 is configured to read the message identifier 54 from the message data 50 location in the printer memory 48. The message identifier 54 points to an external memory location (computer memory 58) that contains the external user message 62. The external user message 62 is the message "Thank You For Purchasing Genuine Hewlett-Packard Products. Other Products Available Include . . . " The external user message 62 is then displayed to the user via the printer display 46, or the display monitor 60 of the computer 66.

Since a printing device such as the laser printer 30 may comprise one or more replaceable components (such as the toner cartridge 32) that may be manufactured by an entity other than the manufacturer of the printer 30, it is important to note that the described invention operates independently of the make, model, or name brand of any replaceable component installed into the printing device. Therefore, if the messaging system is implemented by the printer manufacturer to display a message upon the installation of a new toner cartridge 32 into the printer 30, the message designated by the printer manufacturer will be displayed regardless of whether the name brand of the new toner cartridge is the same as the printer 30.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. In a printing device having memory integrated therein, a method comprising:

detecting when a replaceable component is installed into the printing device;

displaying a consumer message derived from message data in the memory to a user of the printing device; and wherein the message data comprises a pointer that references an electronic representation of the consumer message stored external to the printing device.

2. The method recited in claim 1, wherein the electronic representation of the consumer message is stored in memory of a host computer which is connected to the printing device.

3. The method recited in claim 1, wherein the displaying a consumer message further comprises printing the message from the printing device.

4. The method recited in claim 1, wherein the displaying a consumer message further comprises displaying a consumer message on a printing device display.

5. The method recited in claim 1, wherein the displaying a consumer message further comprises displaying a consumer message on a display of a host computer connected to the printing device.

6. A printing system, comprising:

a printing device having memory with consumer data stored therein;

a user interface; and a processor configured to display a consumer message derived from the consumer data in response to installation of a replaceable component into the printing device, wherein the consumer data comprises a pointer that references an electronic representation of the consumer message stored external to the printing device.

7. The printing system recited in claim 6, wherein:

the printing device is a laser printer; and the replaceable component is a toner cartridge.

8. The printing system recited in claim 6, further comprising:

a host computer connected to the printing device;

computer memory integrated into the host computer, the computer memory storing the electronic representation of the consumer message; and wherein the pointer references the electronic representation of the consumer message in the computer memory.

9. The printing system recited in claim 6, further comprising a detector to detect the installation of the replaceable component.

10. A laser printer, comprising:

memory with consumer message data stored therein;

an installable toner cartridge;

a processor configured to display a consumer message derived from the message data in response to the toner cartridge being installed in the laser printer; and wherein the consumer message data comprises a pointer corresponding to an external memory location, the external memory location storing an electronic representation of the consumer message.

* * * * *